United States Patent [19]

Lutz et al.

[11] Patent Number: 4,988,258
[45] Date of Patent: Jan. 29, 1991

[54] CAR CATCHER

[76] Inventors: Theodore A. Lutz, Box 211, Ingomar, Pa. 15127; Frank K. Ludwin, Box 283, South Heights, Pa. 15081

[21] Appl. No.: 392,831

[22] Filed: Aug. 11, 1989

[51] Int. Cl.$^5$ ............................................. B60R 19/02
[52] U.S. Cl. .................................. 414/500; 414/498; 414/494; 414/480; 293/118; 298/1 R
[58] Field of Search ............ 298/1 R, 1 SG; 414/498, 414/499, 480, 482, 500, 559, 491, 492, 493, 494, 474, 475, 476; 293/118

[56] References Cited

U.S. PATENT DOCUMENTS

| | | | |
|---|---|---|---|
| 3,164,371 | 1/1965 | Royle | 414/498 X |
| 4,026,590 | 5/1977 | Holm | 293/118 |
| 4,372,726 | 2/1983 | Lutz | 414/517 |
| 4,410,207 | 10/1983 | Scharf | 293/118 |
| 4,456,420 | 6/1984 | Newhard | 293/118 X |
| 4,516,902 | 5/1985 | Matson | 414/480 |
| 4,529,349 | 7/1985 | Lutz | 414/478 |
| 4,557,658 | 12/1985 | Lutz | 414/517 |
| 4,702,662 | 10/1987 | Marlett | 414/500 X |

FOREIGN PATENT DOCUMENTS

2426552  12/1975  Fed. Rep. of Germany ...... 293/118

Primary Examiner—Frank E. Werner
Attorney, Agent, or Firm—Clifford A. Poff

[57] ABSTRACT

A car catcher apparatus is provided which is pivotally mounted to an elevated chassis, a flatbed, or other related structure which protrudes rearwardly beyond the rear wheels of a vehicle such as, for example, a truck. The car catcher includes a frame-like structure which is positioned by an actuator to a raised inoperative position and a lowered operative position. In the lowered operative position, the car catcher is in position to receive impact from automobiles, or the like, during collisions therewith. The car catcher apparatus has particular use with rearwardly-protruding truck structure which is periodically intended to be pivotally lowered to a position at or near ground level. When in the raised inoperative position, the car catcher permits complete and unrestricted downward pivoting of such structure. Furthermore, when positioned the raised inoperative position, the car catcher apparatus permits ready access to the rear wheels, axles, suspension, etc., of the truck for purposes of maintenance thereof.

3 Claims, 7 Drawing Sheets

CAR CATCHER

BACKGROUND OF THE INVENTION

1. Field of the Invention: The present invention relates to safety devices, in general, and in particular, to car catcher devices which are mounted to the rear of an elevated vehicle such as a truck. During a rear-end collision between an automobile, or the like, and a truck, such car catchers prevent the automobile from passing under an elevated chassis, flatbed or other structure which protrudes rearwardly beyond the rear wheels of the truck. Consequently, these devices reduce the likelihood of direct impact between the passenger compartment of the automobile and the rearwardly-protruding truck structure and thereby reduce the likelihood of severe or even fatal injuries to the automobile passengers.

2. Description of the Prior Art: Car catcher devices designated for the aforementioned purposes are known in the art. These devices are generally formed as a frame-like structure which is mounted, sometimes removably, to the rearwardly-protruding truck structure so as to downwardly depend therefrom. A portion of the frame-like structure is positioned at an elevation to receive impact from the front end of an automobile during a rear-end collision between the automobile and the truck.

Such devices are useful when mounted to stationary truck structure which is maintained in a generally horizontal and elevated position. However, they become a nuisance when mounted to rearwardly-protruding truck structure which is capable of, and intended to be, periodically downwardly lowered to a position at or near ground level, such as, for example, the pivotable roll-off hoist structure disclosed in my prior U.S. Pat. No. 4,529,349, the disclosure of which is incorporated herein by reference. If used on such pivotable hoist structure, a permanently mounted car catcher would be an extreme hindrance since it would severely limit the downward pivotability of the protruding hoist structure.

As an alternative, detachable car catchers could be mounted to such downwardly pivotable structures. However, a removable car catcher must first be detached before the protruding structure is pivoted downwardly and then must be reattached when the protruding structure is pivoted upwardly into its normal roadway transport position. For obvious reasons, such detachment and reattachment of the car catcher becomes a bothersome if not laborious task each time the pivotable structure is to be placed into service.

An advantage exists, therefore, for a car catcher device which is easily positionable between an operative position and an inoperative position. Such a device would be of particular use with rearwardly-protruding truck structure which is intended to be periodically lowered to a position at or near ground level, such as, for example, the pivotable roll-off hoist structure disclosed in the aforementioned U.S. Pat. No. 4,529,349. Such a car catcher would also have utility when mounted to stationary rearwardly-protruding truck structure in that in a retracted inoperative position, the car catcher would permit ready access to the rear wheels, axles, suspension, etc., for purposes of maintenance thereof.

It is therefore an object of the present invention to provide a car catcher apparatus which is mounted to structure which protrudes rearwardly beyond the rear wheels of an elevated vehicle such as a truck and which is positionable between an operative position and on inoperative position.

It a further object of the invention to provide a car catcher apparatus that, when mounted to lowerable rearwardly-protruding truck structure, permits unrestricted downward lowering of the truck structure.

It is a further object of the present invention to provide a car catcher apparatus that, in an inoperative position, permits ready access to the rear portions of a truck for maintenance thereof.

Still other objects and advantages will become apparent in light of the attached drawings and written description of the invention presented hereinbelow.

SUMMARY OF THE INVENTION

There is provided a car catcher apparatus which is pivotally mounted to truck structure such as an elevated chassis, flatbed or other related structure which protrudes rearwardly beyond the rear wheels of the truck. The car catcher includes a frame-like structure which is positioned by an actuator to a raised inoperative position and a lowered operative position. In the lowered operative position, the car catcher is in position to receive impact from automobiles, or the like, during collisions therewith.

The raisable and lowerable car catcher apparatus has particular use with rearwardly-protruding truck structure which is periodically intended to be pivotally lowered to a position at or near ground level. When positioned in the raised inoperative position, the car catcher permits complete and unrestricted downward pivoting of such structure.

Furthermore, when positioned in the raised inoperative position, the car catcher apparatus permits ready access to the rear wheels, axles, suspension, etc., of the truck for purposes of maintenance thereof.

DESCRIPTION OF THE PREFERRED EMBODIMENT

Figure 1:
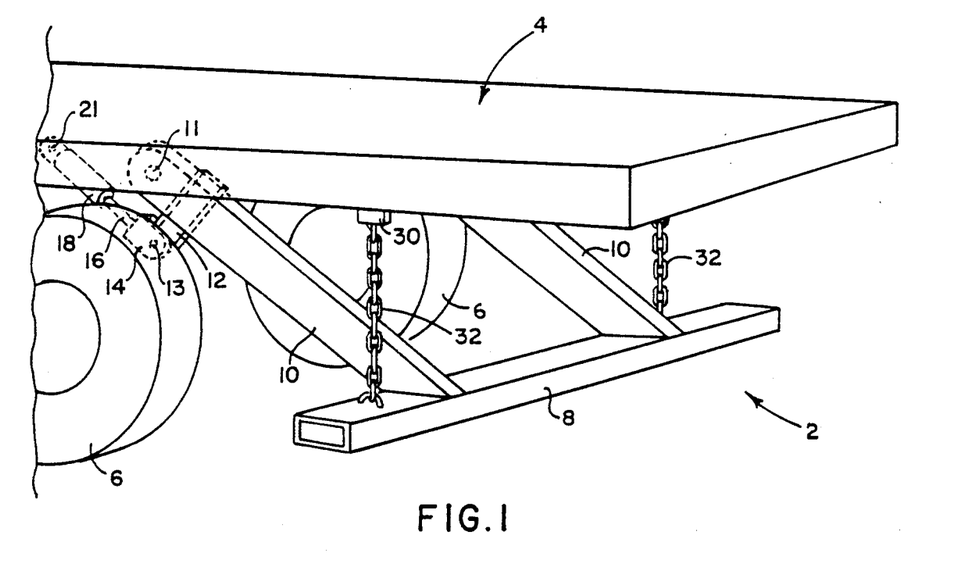
FIG. 1 is a perspective view of the car catcher of the present invention in an operative position and mounted to structure protruding rearwardly from the rear wheels of an elevated vehicle such as a truck.

In FIG. 1 there is illustrated a car catcher apparatus 2 constructed in accordance with the present invention. Car catcher apparatus 2 is formed as a frame structure and is mounted to an elevated structure 4 such as a chassis, a flatbed or, as will be described later, a pivotable roll-off hoist structure like that disclosed in my prior U.S. Pat. No. 4,529,349 which protrudes rearwardly beyond the rear wheels 6 of a vehicle, e.g., a truck or the like.

Car catcher 2 includes a steel cross-bar means 8 which is preferably formed as 4"×2"¼" wall thickness box channel but which also may be suitably formed as a solid bar, an angle member, an I-beam, or the like. Cross-bar means 8 extends substantially transversely to the direction of travel of the vehicle. When in a lowered, operative position such as that depicted in FIG. 1, cross-bar means 8 is capable of receiving the impact from the front end of an automobile, or the like, during a collision therewith so as to prevent the automobile from passing under the rearwardly-protruding elevated structure 4 and to thereby somewhat reduce the likelihood of severe or even fatal injuries to the automobile passengers. When in the lowered, operative position the bottom surface of the cross-bar means 8 extends substantially parallel to the ground surface.

Rigidly secured to cross-bar means 8 and extending in a forward direction, i.e. toward the front of the vehicle, are a pair of spaced brace members 10. Brace members 10, like cross bar 8, are preferably formed as 4"×2"×¼" wall thickness box channel. Each of the brace members 10 is pivotally secured to a respective longitudinally-extending side member 26 of elevated structure 4 by a pivot pin 11. With such a construction it should now be appreciated that the frame-like structure of the car catcher apparatus 2 is vertically pivotable about substantially horizontal pivot axis 11a (FIG. 2).

Figure 2:
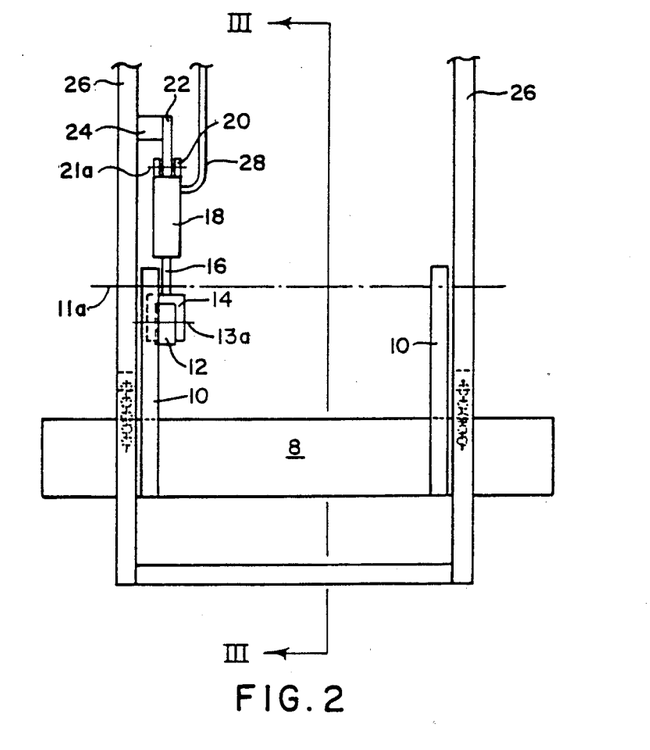
FIG. 2 is a plan view of the car catcher of the present invention with certain details of the truck to which it is mounted being omitted for purposes of clarity.
Figure 3:
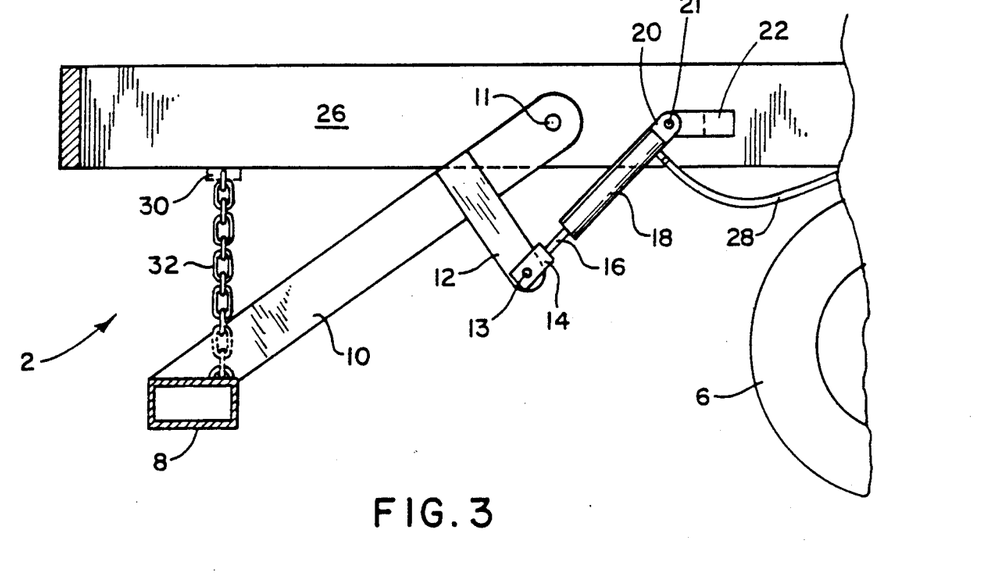
FIG. 3 is a view of the car catcher of the present invention as seen along line III—III of FIG. 2, the car catcher being in an operative position.
Figure 4:
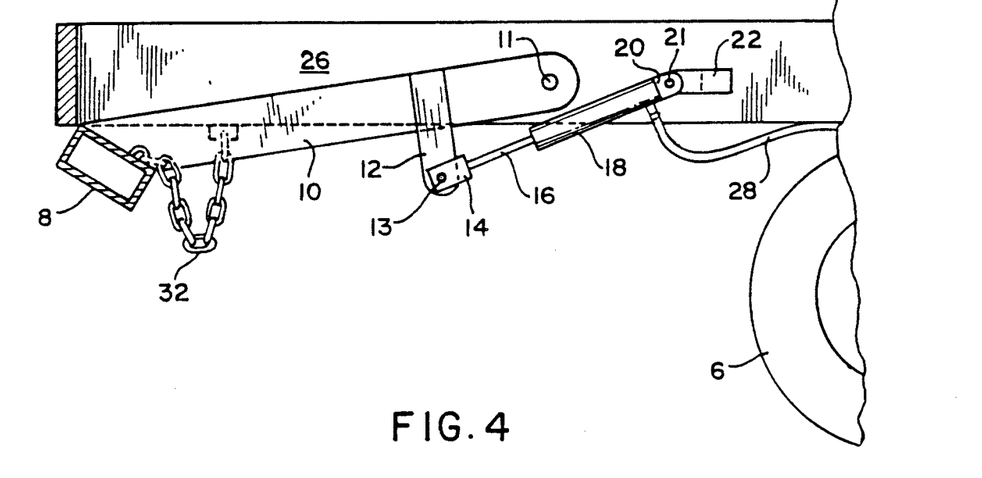
FIG. 4 is view similar to FIG. 3 but instead illustrating the car catcher in an inoperative position.

Referring now to FIG. 2 in which the top cover of the rearwardly-protruding elevated structure 4 has been omitted for purposes of clarity, it can be seen that a lever means 12 is rigidly secured to a first of the brace members 10. Pivotally connected to the lever means 12 via pivot pin 13 is a yoke member 14 which is connected to an extendable member 16 of an extensible actuator 18. Extensible actuator 18 may suitably take the form of a hydraulic cylinder, a pneumatic cylinder, an electric screw jack, or the like. The base of the extensible actuator is provided with a yoke 20. Yoke 20 is pivotally connected to bracket 22 via pivot pin 21 and bracket 22 is fixedly secured to mounting member 24 which, in turn, is fixedly secured to a first of the side members 26 of rearwardly-protruding elevated structure 4.

A power supply line 28, which may carry either hydraulic fluid, air or electricity, depending on the chosen type of extensible actuator 18, is connected to a suitable source (not shown) of pressurized hydraulic fluid, pressurized air or electricity, whereby the vehicle operator may control a switch connected to the power supply line 28 to pivot the car catcher between its lowered, operative position (FIGS. 1, 3, 8 and 15) to its raised, inoperative position (FIGS. 4, 8, 10, 13, 14 and 16).

It should be understood that while only a single actuating system is shown, there may also be a second such system for simultaneously pivoting the second of the brace members 10, if so desired.

Fixedly secured to each side member 26 is a block 30. Depending from each block 30 is a high-strength flexible connector such as chain 32. At its opposite end, each chain 32 is connected to cross-bar means 8. High-strength cables may be used in place of the chains 32 if desired.

The purpose of the high-strength chains 32 is twofold. First, chains 32 act as a stop means to limit the downward pivoting of the car catcher 2. Second, they bear the brunt of the impact energy from a vehicular collision against cross-bar means 8 and transmit this energy to the elevated structure 4 where it can then be dissipated throughout the vehicle. Thus, the chains 32 protect the extensible actuator 18 and the brace members 10 from damage caused by collision impact.

As noted previously, the elevated structure 4 may be any chassis, flatbed, or the like, which protrudes rearwardly beyond the rear wheels 6 of a vehicle such as a truck. However, a type of rearwardly protruding elevated structure 4 with which the present invention has particular advantageous use is a roll-off hoist structure such as that disclosed in my prior U.S. Pat. No. 4,529,349. The structure and operation of such a roll-off hoist in combination with the car catcher apparatus 2 of the present invention is described hereinbelow with reference to FIGS. 5 through 16.

Figure 5:
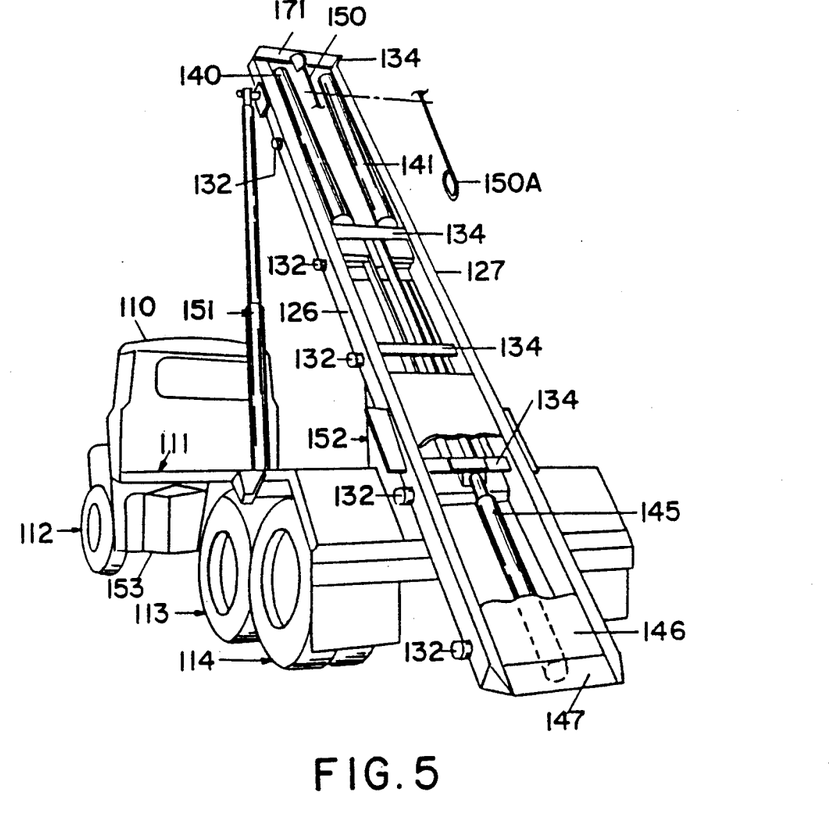
FIG. 5 is a perspective view of a truck having a vertically-pivotable, rearwardly-protruding roll-off hoist structure to which the car catcher of the present is particularly well adapted for use.

In FIG. 5 there is illustrated a vehicle of the type having a driver's cab 110 on the forward part of a chassis frame 111 which is supported by conventional steerable front wheel assemblies 112. The rear portion of the chassis frame is supported by tandem drive wheel assemblies 113 and 114. Other forms of vehicles may also be provided with the aforesaid roll-off hoist and the car catcher apparatus 2 of the present invention. One such vehicle is a trailer having a fifth wheel by which the trailer is driven and controlled by a tractor in a manner, per se, well known in the art.

As shown in FIGS. 8–11 the chassis 111 includes conventional spaced-apart and generally parallel chassis frame members 115 and 116 that are joined together at various locations by cross-members. An additional cross-member is an end plate 117 behind the frame members 115 and 116. A pivot pin 121 is supported in bores in the hinge plates 118 and 119 and in bores in spaced-apart, downwardly-extending lugs 122 and 123 of a hinge bar 124 (FIG. 9) that fit between plates 118 and 119. The hinge bar pivots about an axis along the length of the pin. Hinge bar 124 is secured to the undersurface of a slide carrier 125 at an aft portion thereof which preferably takes the form of a rectangular plate. The slide carrier 125 extends forwardly toward cab 110 from the hinge bar 124 between parallel and spaced-apart hoist rails 126 and 127 forming part of a hoist frame. Slide carrier 125 also extends rearwardly from the hinge bar 24 beyond the drive wheel assemblies 113 and 114 to form a rearwardly-protruding elevated structure 4 to which the car catcher apparatus 2 of the present invention is mounted. In particular, the car catcher is mounted to rear portions of the hoist rails 126 and 127. If desired the car catcher apparatus may also be mounted to the chassis frame members 115 and 116.

Figure 8:
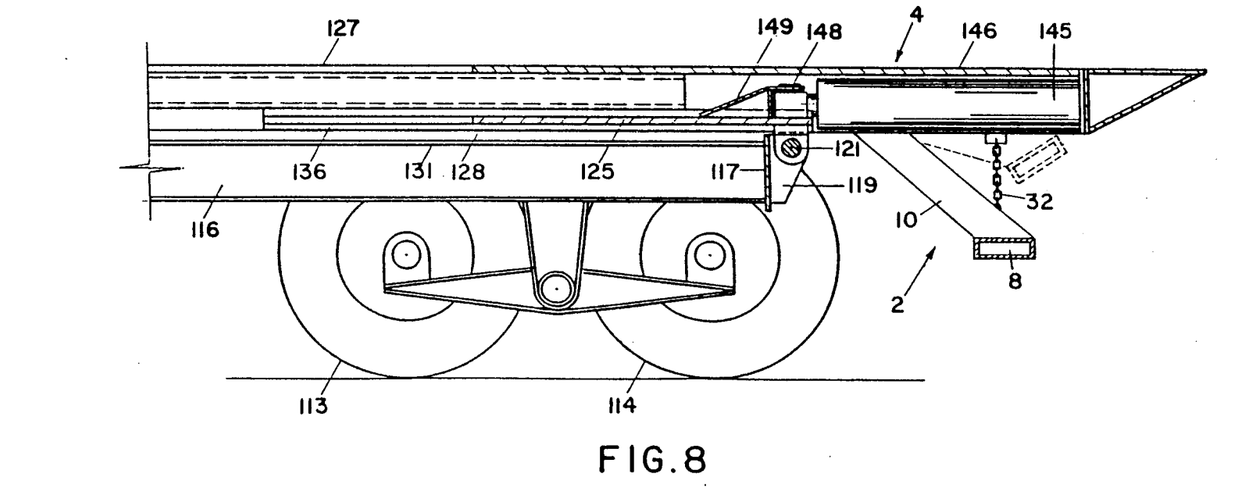
FIG. 8 is a sectional view taken along line VIII—VIII of FIG. 7.

As can be seen in FIG. 8, the car catcher apparatus 2 is shown in solid lines in its downwardly—pivoted, operative, "car-stopping" position as it would be during normal highway transport, and in dashed lines as it would be during a container loading or dumping operation as will be described in more detail hereinafter with regard to FIGS. 10, 13, 14 and 16.

Figure 7:
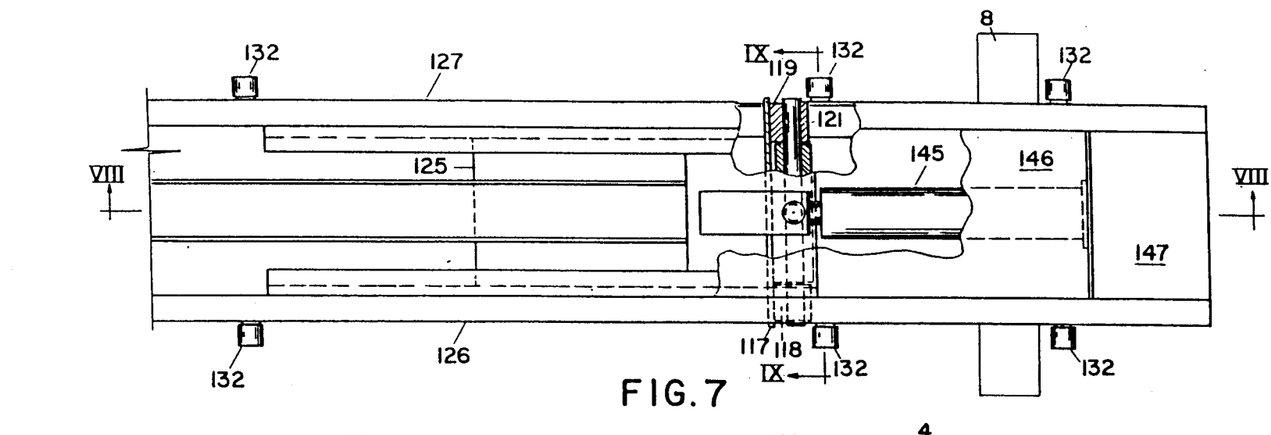
FIG. 7 is a plan view, partly in section, of the aft portion of the hoist structure depicted in FIG. 5 shown carrying the car catcher of the present invention.
Figure 9:
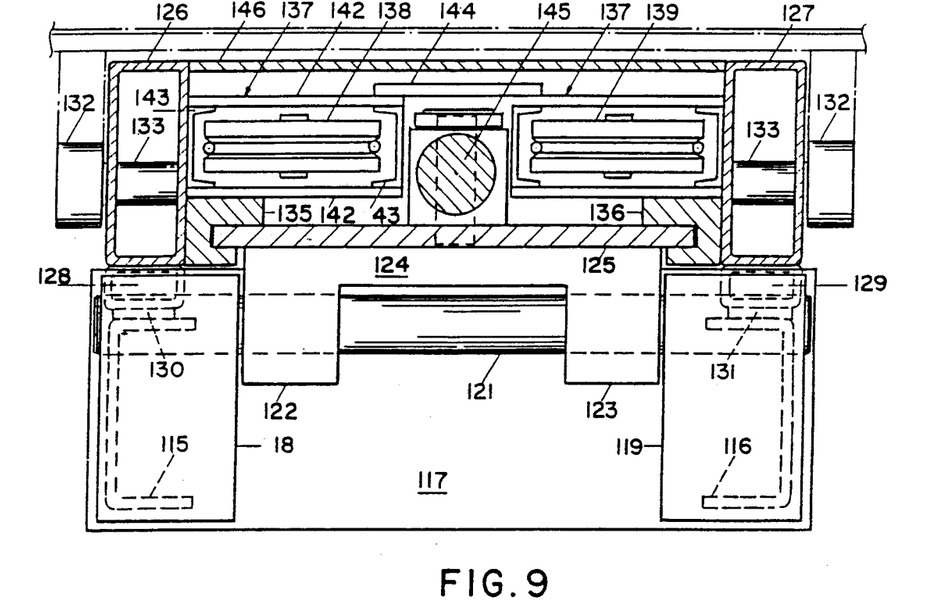
FIG. 9 is a sectional view taken along line IX—IX of FIG. 7.
Figures 10, 12:
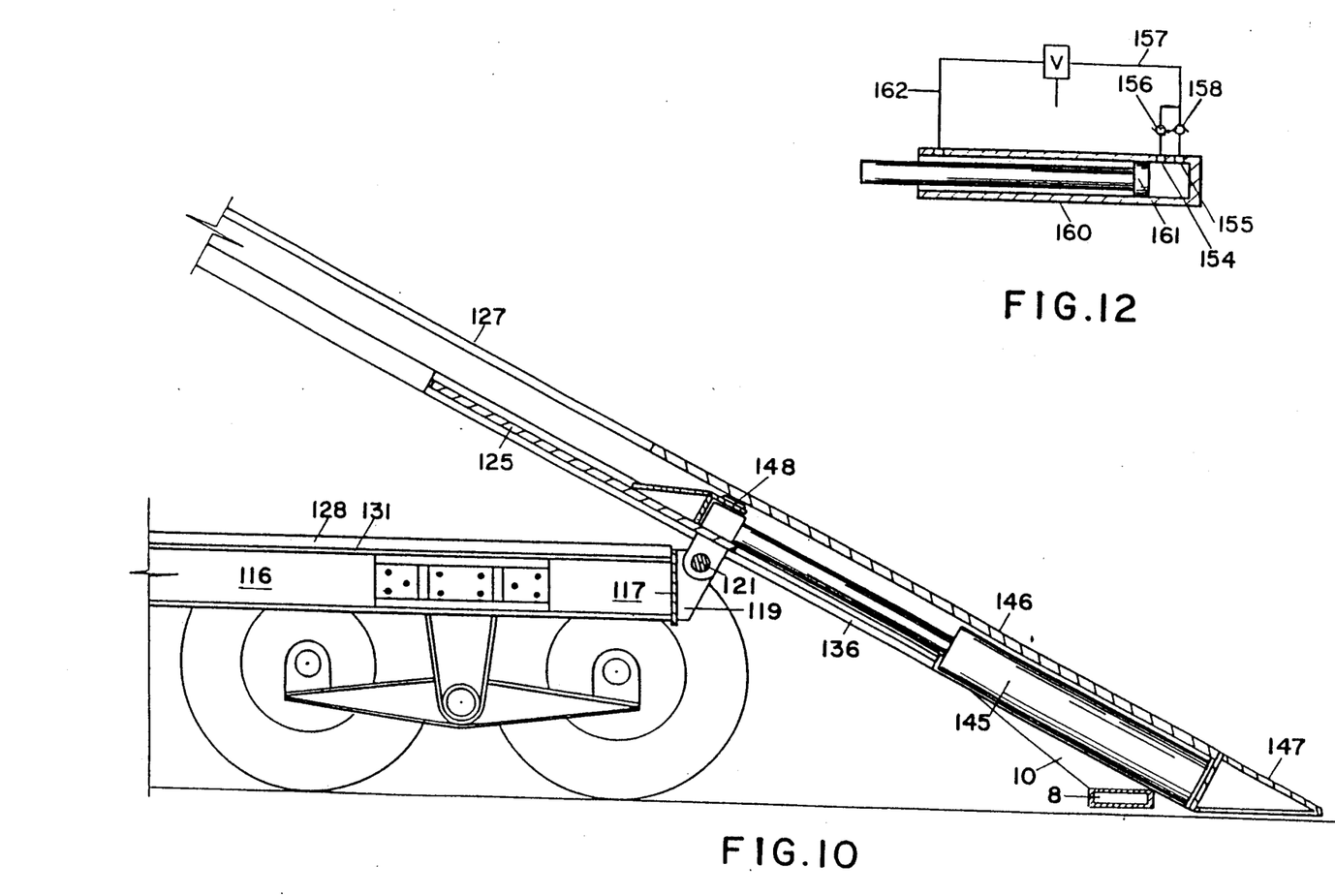
FIG. 10 is a sectional similar to FIG. 8 but illustrating the rear portion of the hoist structure FIG. 5 in a position for receiving or unloading a container and illustrating the car catcher of the present invention in an inoperative position.
FIG. 12 is a schematic view of an arrangement of check valves which form a cushion for the hoist structure lift cylinder.

Hoist rails 126 and 127 are parallel with and generally overlie frame members 115 and 116, respectively, of the vehicle but interposed therebetween are sub-frame members 128 and 129 and spacers 130 and 131, respectively. The spacers 130 and 131 facilitate assembling of the roll-off hoist on the frame of a vehicle. The spacers are welded to the vehicle frame and to the sub-frame members 12 and 129 during assembly. At each spaced-apart location on the outside of the rails 126 and 127 there is, as shown in FIGS. 5, 7 and 9, a roller 132 supported on an arbor 133 to engage with rails of the understructure of a roll-off container. Cross braces 134 tie the rails 126 and 127 together to prevent their movement toward or away from each other.

As shown in FIG. 9, opposite lateral sides of the slide carrier 125 are received in elongated slots of guides 135 and 136, each having a U-shaped cross section. The opposite sides of the carrier 12 contain the rails 126 and 127 to slide the forward or aft direction of the vehicle chassis. The guides are welded to the hoist frame rails 126 and 127 beneath housing assemblies 137. The housing assemblies form two longitudinal chambers to slidably receive sheave blocks 138 and 139 that are clevis—mounted on the rod ends of winch cylinders 140 and 141, respectively, as shown in FIG. 5. Each housing assembly 137 is comprised of upper and lower plates 142 welded to spaced-apart channel members 143. Each of the sheave blocks 138 and 139 is supported by an arbor between clevis plates so that the sheave can rotate about a vertical axis. A tie plate 144 interconnects the plates 142 at the top of the housing assemblies and forms an elongated chamber therebetween wherein the rod end of a piston and cylinder assembly 145 is protectively housed when the piston is extended from the cylinder portion thereof. A guard plate 146 extends between the frame rails 126 and 127 above the housing assemblies 137 and from a ramp 147, which is welded to the frame rails 126 and 127, to a point forwardly beyond the hinge pin 121. The plate extends forwardly along the hoist to protectively cover the piston and cylinder assembly 145, when fully extended, to prevent damage that might otherwise occur in the event of a derailment of a container during loading and unloading operations on the hoist. The cylinder portion of assembly 145 is flange-mounted to an end wall of a crossmember forming ramp 147. The rod end of the assembly 145 is mounted by a clevis pin 148 extending through a clevis end of the piston rod and through a clevis support 149 which is secured to the slide carrier 125. A cable 150 is anchored at one end to a hoist rail and trained about a system of pulleys that includes sheave blocks 138 and 139 in a manner, per se, known in the art, so that a hook 150A on the free end of the cable can be drawn along the length of the hoist rails.

Hoist frame rails 126 and 127 extend from the ramp 147 forwardly beyond the plane of the pivot shaft along the sub-frame on the chassis frame to a point that is about 6 inches from the back of the driver's cab. Connected to the sides of the forward portion of the hoist frame rails are the rod ends of piston and cylinder assemblies 151 and 152 which are pivotally mounted at their cylinder ends by brackets to the chassis frame of the vehicle. The piston and cylinder assemblies 151 and 152 link the forward portion of the hoist rails to the chassis frame so that the rails jut from the vehicle for loading or unloading a container. As shown in FIG. 5, a tank 153 for hydraulic fluid is supported by brackets extending laterally from a side of the vehicle frame. A pump is connected by a drive shaft to a power take-off drive of the vehicle propulsion system in a manner, per se, well known in the art. The pump delivers hydraulic fluid through a plurality of reversing control valves for separate and controlled delivery to piston and cylinder assemblies 140, 141, 145, 151 and 152.

Figure 11:
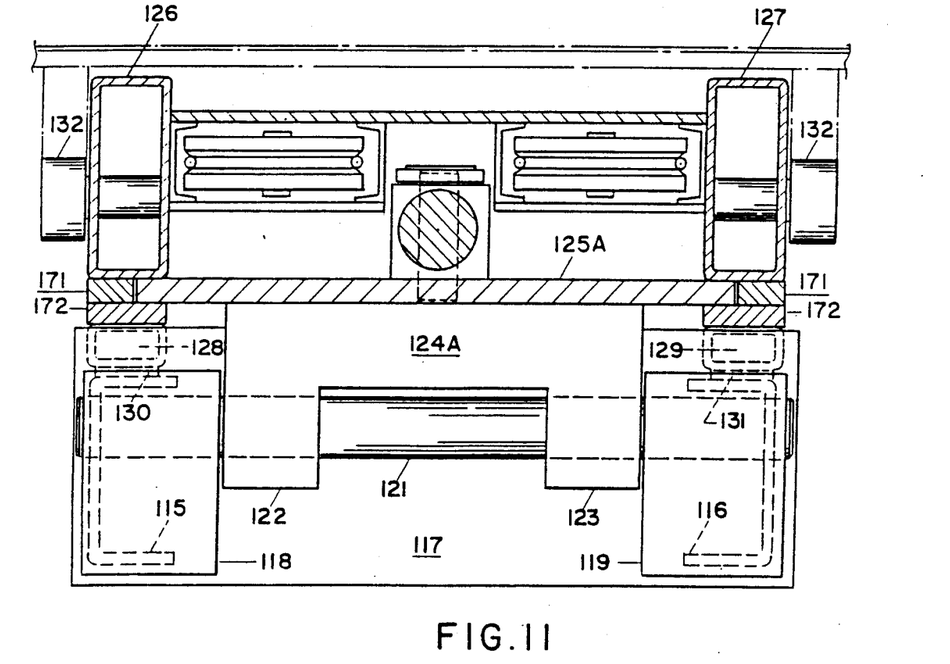
FIG. 11 is a sectional view similar to FIG. 9 but illustrating a variation of the roll-off hoist structure depicted in FIG. 5.

A modification to the roll-off hoist is shown in FIG. 11. In FIG. 11, the reference numerals which are the same as reference numerals previously identified, are used to identify the same parts. The modification shown in FIG. 11 provides that a slide carrier 125A has a greater width than slide carrier 125 (FIG. 9) so as to extend midway of the width of the hoist frame rails 126 and 127 in gaps formed by spacer strips 171. The strips are welded to rails 126 and 127, as shown, and to keeper plates 172 to form guide pockets to permit sliding of the hoist frame rails along opposite sides of the slide carrier 125A. The keeper plates 172 are supported on the sub-frame members 128 and 129 which are secured to the chassis frames 115 and 116 as previously described. Hinge bar 124A is welded to the slide carrier 125A in the same manner as hinge bar 124 is weld to carrier 125. The hinge bar 124A includes the downwardly-extending lugs 122 and 123 and engage pivot 121.

To avoid damage to the piston and cylinder assemblies 151 and 152, a cushion of hydraulic fluid is always maintained between the cylinder end and the piston in each of these assemblies. As shown schematically in FIG. 12, each of the assemblies 151 and 152 has two ports 154 and 155 formed at spaced-apart locations closely adjacent the end wall of the cylinder 160. Port 154 is connected by a check valve 156 to a hydraulic supply line 157 having a branch portion which is connected by a check valve 158 to port 155. When a piston 161 is retracted along the cylinder by the introduction of hydraulic fluid through line 162 into the cylinder at the rod end thereof, hydraulic fluid is exhausted from the cylinder end portion through port 154 and thence through the check valve 156 until the piston passes beyond port 154. Hydraulic fluid can no longer be exhausted from port 154. Port 155 is blocked against exhausting of hydraulic fluid by the check valve 158. This prevents depletion of a small but effective volume of hydraulic fluid between piston 161 and the end wall of the cylinder 159 which cushions the piston against contact with the cylinder. When it is desired to extend the piston from the cylinder, fluid is admitted to the cylinder through line 157 beyond check valve 158 and through port 155.

Figure 6:
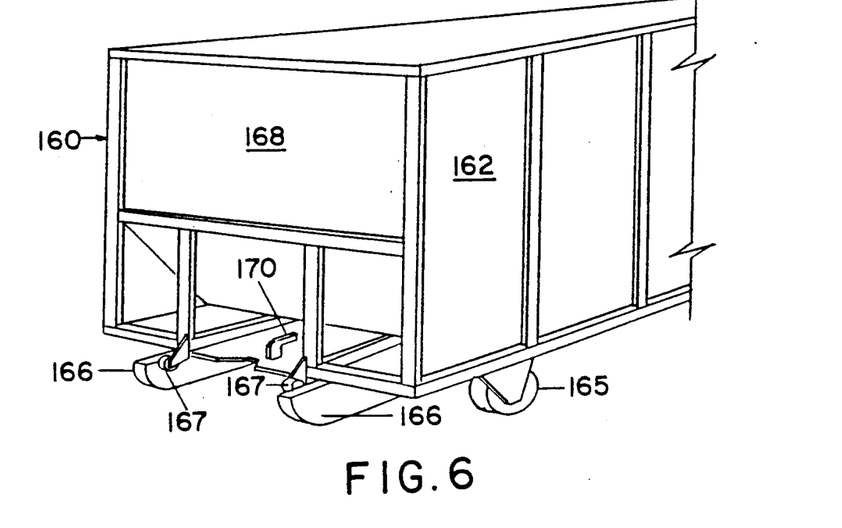
FIG. 6 is a perspective view of a roll-off container for use with the hoist structure depicted in FIG. 5.

In FIG. 6 there is illustrated the forward end portion of a roll-off container 160 of the type which is suitable for loading and unloading onto a vehicle through the use of the roll-off hoist. The container is, per se, known in the art and may take the form of a container disclosed in my U.S. Pat. No. 4,372,726. The container includes upstanding side walls 162, a floor wall 163 and a roof wall 164. The container is elongated and wheel assemblies 165 are provided at the four corners of the floor wall to support the container on the ground between the wheels, the floor supports downwardly-extending rails 166 that extend the entire length of the container. A floor plate extends between these rails. The rails 166 extend forwardly beyond a front end wall 168 of the container where they support guide rollers 167 employed to facilitate entry and discharge of the forward portion of the container onto and from the hoist on a vehicle. On the floor wall between the rails 166 is a hook 170 to which can be secured to the free end of a winch cable.

Figure 13:
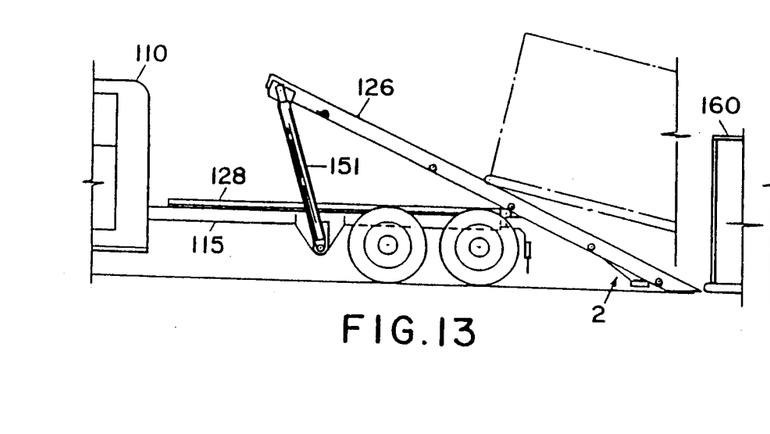
FIGS. 13–15 illustrated successive positioning of the hoist structure of FIG. 5 to load a container at ground level onto a vehicle and the positioning of the car catcher of the present invention throughout the loading process.

As shown in FIG. 13, the roll-off hoist is positioned to receive a roll-off container by delivering hydraulic fluid to piston and cylinder assembly 145 which juts the hoist frame rails rearwardly along the slide carrier. As the forward portion of the hoist frame extends upwardly from the aft portion of the vehicle, the portion of the frame over-hanging the pivot shaft 121 and carrying car catcher apparatus 2 descends toward the ground. As can be seen from FIGS. 8, 13 and 14, the car catcher 2 is first fully pivoted to its uppermost inoperative position so that it does not preclude any downward pivotal descent of the rearwardly-protruding structure 4 of slide carrier frame 125. And, as most clearly illustrated in FIG. 10, complete downward pivoting of the rearwardly-protruding structure 4 is permitted when the car catcher 2 is in its inoperative position to thereby preserve complete operability of the roll-off hoist.

Figure 14:
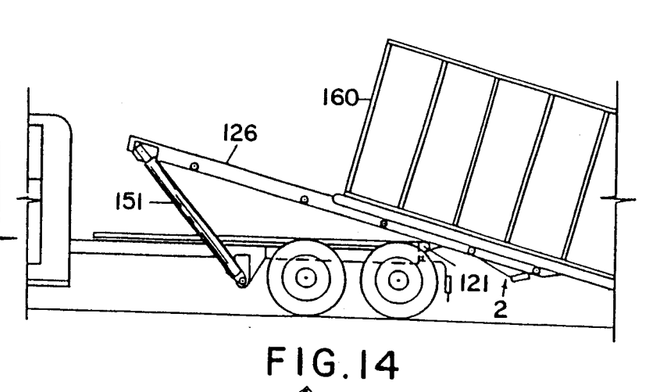
Figure 15:
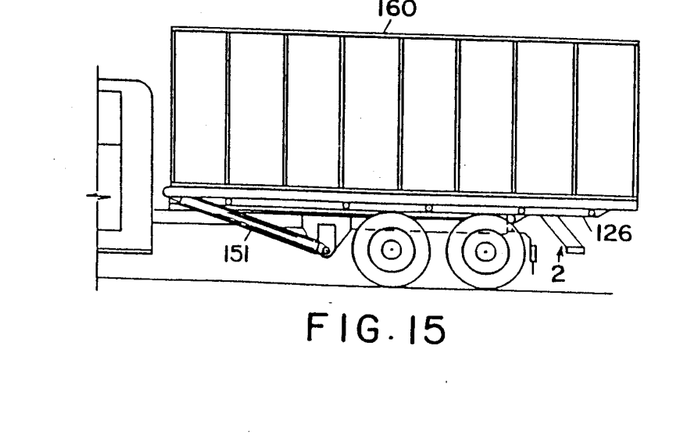

The control valves for piston and cylinder assemblies 151 and 152 are placed or remain in a position so that hydraulic fluid is not supplied to either end of the piston but a cushion of hydraulic fluid is trapped and remains between the pistons and the cylinders thereof. This prevents damaging metal-to-metal contact between the pistons and cylinders under the load imposed thereon as the hoist rails swing about the linkage provided by assemblies 151 and 152. The movement of the hoist rails continues until the ramp 147 engages the ground at a point that is closely adjacent the forward portion of the container. The cable 150 of the winch is then paid-out so that a hook 150A can be engaged with the hook 170 on the container. The winch cylinders 140 and 141 are operated to draw the container toward the hoist so that the slide bar 167 of the container engage and slide along the rollers 132 supported by rails 126 and 127 of the hoist. Continued operation of the winch draws the container along the hoist rails to a position which is generally indicated by phantom lines in FIG. 13. Thereafter, as shown in FIG. 14, the hoist rails are repositioned on the vehicle into an intermediate position by retracting the hoist rails onto the vehicle by operation of piston and cylinder assembly 145. The hoist rails are moved to a generally parallel relation with the rails of the container whereupon the winch is again operated to draw the container along the hoist rails. Concurrently therewith, if desired, the piston and cylinder assembly 145 is operated to slide the hoist rails forwardly along the vehicle into a position where the hoist rails are wholly supported on the chassis frame of the vehicle as shown in FIG. 15. The winch is operated to draw the container forwardly on the hoist rails to a point where stop 171 (FIG. 5) at the forward portion of the hoist engages with the rollers 167 on the forward portion of the container. Conventional latches may be set to interconnect the container with the hoist rails. The container can then be transported by the vehicle. During such transport, as mentioned previously and as seen in FIGS. 8 and 15, the car catcher apparatus is lowered to its operative position.

The container can be unloaded from the vehicle at a desired site by operating the piston and cylinder assembly 145 to jut the hoist rails rearwardly of the vehicle frame while the forward portion of the hoist rails swings upwardly about the piston and cylinder assemblies 151 and 152 which are supplied with hydraulic fluid. The car catcher 2 is pivoted upwardly to its inoperative portion and the hoist rails are swung from a position shown in FIG. 15 to a position shown in FIG. 13. The winch cylinders are then operated to pay-out cable which permits the container to slide on rollers 132 along the hoist rails until the wheels at the rear of the container engage the ground. The forward portion of the container may slide rearwardly along the hoist rails and into engagement with the ground. If necessary, the vehicle can be advanced forwardly after the rear wheels of the container engage the ground in the event the container does not move under gravity from the hoist. The winch will be used to control rearward sliding movement of the container along the hoist rails.

Figure 16:
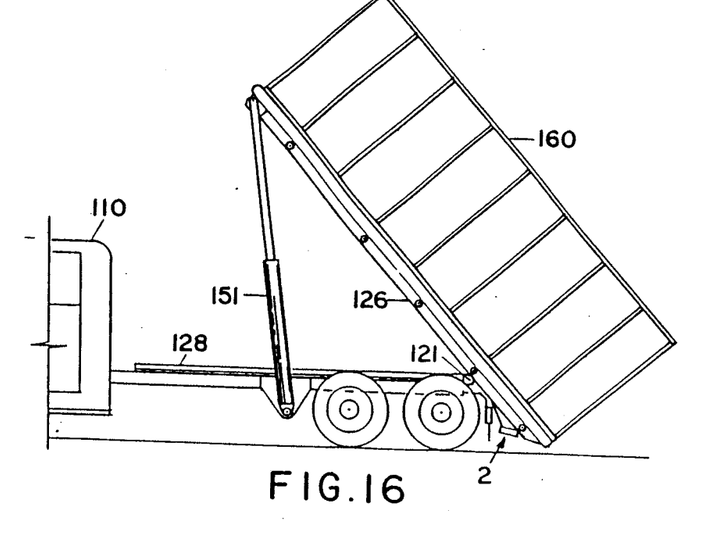
FIG. 16 is a view illustrating a container dumping position of the hoist structure depicted in FIG. 5 and the positioning of the car catcher of the present invention to an inoperative position during such dumping operation.

In FIG. 16, the roll-off hoist is shown in a position in which a roll-off container on the hoist is positioned for dumping material from the aft end of the container. Such a dumping operation is typically carried out at a land-fill area or other preselected dump site. Upon arrival at the dump site, the hoist of the present invention and container supported thereby are situated on the chassis of a vehicle as shown in FIG. 15. Sometimes a rear door is hinged to the container and it is swung to an open position. Again, the car catcher 2 is pivoted upwardly to its inoperative position. Then, hydraulic fluid is supplied to the piston and cylinder assemblies 151 and 152 which lift the forward end of the hoist and container supported thereon about pivot 121 at the aft portion of the vehicle. The hoist is swung in this manner to the position shown in FIG. 16 in which the pistons are fully extended from the cylinders. Normally, for example, the forward end of the hoist is swung to an elevation that is at least 17 feet above ground level. The piston and cylinder assembly 145, however, is not energized while the container is swung into the dumping position. A further feature is that after the container is swung into the position shown in FIG. 16, the piston and cylinder assembly 145 can be operated so that the piston moves in a back and forth direction along the cylinder with very short strokes, e.g., one-half inch, and with abrupt changes in direction by the operation of the control valves. This procedure will shake loose any tightly-compacted material in the container.

While the preferred embodiment of the present invention is the car catcher used in combination with the roll-off hoist structure depicted in FIGS. 5-16, it is contemplated, as mentioned at the outset, that the car catcher apparatus may be used in combination with essentially stationary and simple elevated structure such as a truck chassis, flatbed, or the like. When used with such structure, the car catcher may be conveniently retracted to provide ready access to the rear portions of the vehicle for maintenance thereof.

While the present invention has been described in accordance with the preferred embodiments of the various figures, it is to be understood that other similar embodiment may be used or modifications and additions may be made to the described embodiment for performing the same functions of the present invention without deviating therefrom. Therefore, the present invention should not be limited to any single embodiment but rather construed in breadth and scope in accordance with the recitation of the appended claims.

We claim:

1. The combination of a roll-off hoist structure having first and second end portions and apparatus for substantially preventing passage of a first vehicle under said second end portion when said roll-off hoist structure is in a first substantially horizontal position, said roll-off hoist structure being mounted to a second vehicle and said second end portion protruding rearwardly beyond rear wheels of said second vehicle, said combination comprising:

means mounted to said second vehicle for vertically pivoting said hoist structure about a horizontal axis between said first substantially horizontal position and a second position in which said first end portion is upwardly inclined and said second end portion is downwardly inclined;

frame means attached to said second end portion;

means for positioning said frame into an operative position and an inoperative position, said means for positioning being operable to position said frame means either into said operative position or said inoperative position at such time when said roll-off hoist structure is in said first position;

spaced-apart chains connected at first ends thereof to said roll-off hoist structure and at second ends thereof to said frame means, said spaced-apart chains preventing positioning of said frame means into a position beyond said operative position and serving to transmit collision impact energy imparted thereto by said first vehicle into said roll-off hoist structure of said second vehicle, whereby at such time when said roll-off hoist structure is in said first position said frame means is positionable either into said inoperative position or said operative position, said operative position substantially preventing, during a collision between said first and second vehicles, said passage of said first vehicle under said second end portion; and prior to such time that said roll-off hoist structure is pivoted from said first position to said second position said frame means is positioned into said inoperative position to permit full downward inclination of said second end portion such that a distal end thereof is capable of being positioned substantially at ground level.

2. The combination of claim 1 wherein said means for positioning comprise extensible actuator means.

3. The combination of claim 2 wherein said frame means is pivotally attached to said roll-off hoist structure, said extensible actuator means serving to pivot said frame means into said operative and inoperative positions.

* * * * *